US005623685A

United States Patent [19]
Leedom et al.

[11] Patent Number: 5,623,685
[45] Date of Patent: Apr. 22, 1997

[54] VECTOR REGISTER VALIDITY INDICATION TO HANDLE OUT-OF-ORDER ELEMENT ARRIVAL FOR A VECTOR COMPUTER WITH VARIABLE MEMORY LATENCY

[75] Inventors: George W. Leedom, Jim Falls; William T. Moore, Elk Mound, both of Wis.

[73] Assignee: Cray Research, Inc., Eagan, Minn.

[21] Appl. No.: 347,953

[22] Filed: Dec. 1, 1994

[51] Int. Cl.$^6$ .............................. G06F 9/38; G06F 12/06
[52] U.S. Cl. ................. 395/800; 395/500; 395/200.03
[58] Field of Search ........................ 395/800, 375, 395/200.06, 200.2, 496, 775, 476, 478, 650, 600, 500, 200.3, 200.15, 472, 700; 364/DIG. 1, DIG. 2, 730, 489

[56] References Cited

U.S. PATENT DOCUMENTS

| | | | |
|---|---|---|---|
| 4,128,880 | 12/1978 | Cray, Jr. ................................. | 395/800 |
| 4,617,625 | 10/1986 | Nagashima et al. .................... | 395/800 |
| 4,636,942 | 1/1987 | Chen et al. ............................. | 395/742 |
| 4,661,900 | 4/1987 | Chen et al. ............................. | 395/800 |
| 4,745,545 | 5/1988 | Schiffleger ............................. | 395/471 |
| 4,745,547 | 5/1988 | Buchholz et al. ...................... | 395/800 |
| 4,754,398 | 6/1988 | Pribnow ............................ | 395/200.06 |
| 4,760,545 | 7/1988 | Inagami et al. ........................ | 395/800 |
| 4,870,569 | 9/1989 | Nakatami et al. ..................... | 395/478 |
| 4,901,230 | 2/1990 | Chen et al. ............................. | 395/476 |
| 5,142,638 | 8/1992 | Schiffleger ............................. | 395/478 |
| 5,247,637 | 9/1993 | Leedom et al. ........................ | 395/476 |
| 5,349,667 | 9/1994 | Kaneko .................................. | 395/740 |
| 5,349,677 | 9/1994 | Cray et al. ............................. | 395/800 |
| 5,390,300 | 2/1995 | Pribnow et al. ....................... | 395/375 |
| 5,442,797 | 8/1995 | Casavant et al. ...................... | 395/800 |

FOREIGN PATENT DOCUMENTS

| | | |
|---|---|---|
| 0140299A3 | 10/1984 | European Pat. Off. . |
| 0195245A2 | 2/1986 | European Pat. Off. . |
| 0305639A2 | 4/1988 | European Pat. Off. . |
| 2113878 | 12/1982 | United Kingdom . |

OTHER PUBLICATIONS

IBM Systems Journal, vol. 25, No. 1, 1986 Armonk, New York, US, pp. 51–62, W. Buchholz, "The IBM System/370 Vector Architecture."

International Search Report for PCT/US 95/09661; Date of completion: Nov. 16, 1995; Authorized Officer: T. Daskalakis.

*Primary Examiner*—Daniel H. Pan
*Attorney, Agent, or Firm*—Schwegman, Lundberg, Woessner & Kluth, P.A.

[57] ABSTRACT

Method and apparatus for vector processing on a computer system. As the last element of a group of elements (called a "chunk") in a vector register is loaded from memory, the entire chunk is marked valid and thus made available for use by subsequent or pending operations. The vector processing apparatus comprises a plurality of vector registers, wherein each vector register holds a plurality of elements. For each of the vector registers, a validity indicator is provided wherein each validity indicator indicates a subset of the elements in the corresponding vector register which are valid. A chunk-validation controller is coupled to the validity indicators operable to adjust a value of the validity indicator in response to a plurality of elements becoming valid. An arithmetic logical functional unit (ALFU) is coupled to the vector registers to execute functions specified by program instructions. A vector register controller is connected to control the vector registers in response to program instructions in order to cause valid elements of a selected vector register to be successively transmitted to said ALFU, so that elements are streamed through said ALFU at a speed that is determined by the availability of valid elements from the vector registers. The ALFU optionally comprises a processor pipeline to hold operand data for operations not yet completed while receiving operands for successive operations. The ALFU also optionally comprises an address pipeline to hold element addresses corresponding to the operands for operations not yet completed while receiving element addresses corresponding to the operands for successive operations.

18 Claims, 15 Drawing Sheets

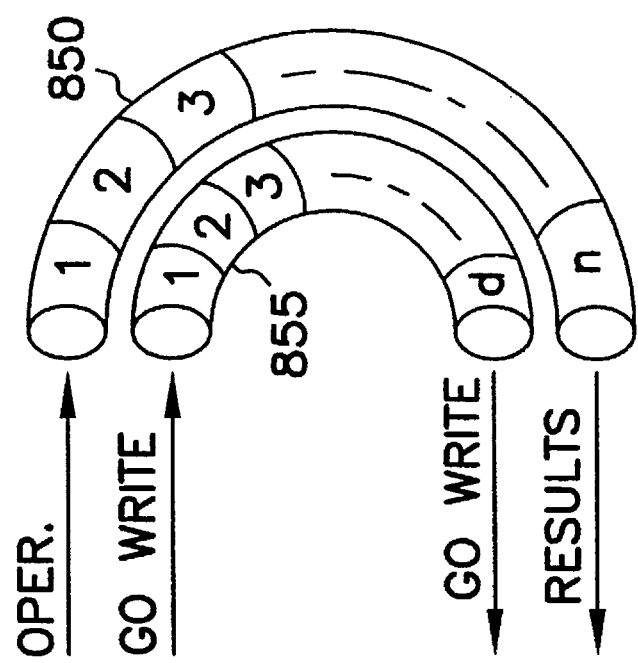

VECTOR REGISTER VALIDITY INDICATION TO HANDLE OUT-OF-ORDER ELEMENT ARRIVAL FOR A VECTOR COMPUTER WITH VARIABLE MEMORY LATENCY

FIELD OF THE INVENTION

The present invention relates to methods and apparatus for memory access for high-speed computers and more specifically to validity chaining in high-speed vector processors.

BACKGROUND OF THE INVENTION

A high-speed computer having vector processors (a "vector computer") requires fast access to data in memory. The largest and fastest of such computers are known as supercomputers. One method of speeding up a computer is by "pipelining," wherein the computer's digital logic between an input and an output is divided into several serially connected successive stages. Data are fed into the computer's input stage before data previously input are completely processed through the computer's output stage. There are typically many intermediate stages between the input stage and the output stage. Each stage performs a little more of the overall function desired, adding to the functions performed by previous stages. Thus, multiple pieces of data are in various successive stages of processing at each successive stage between the input and output stages. Since each individual stage performs only a small part of the overall function, the system clock is shortened. Each successive clock propagates the data one stage further in the pipeline.

As a result of pipelining, the system clock can operate at a faster rate than the system clocks of non-pipelined systems. In some computer designs of today, the system clock cycles in as fast as two nanoseconds ("ns"), allowing up to 500 million operations per second though a single functional unit. Parallel functional units within each processor, and parallel processors within a single system, allow even greater throughput. Achieving high-performance throughputs is only possible, however, if data are fed into each pipeline at close to the system clock rate.

Another way of increasing performance on supercomputers is by going to systems of multiprocessors, where multiple central processing units (CPUs) are coupled together. Some multiprocessor systems share one or more common memory subsystems among the CPUs. Some systems have several CPUs, each of which has several independent vector processors which can operate on more than one vector operation simultaneously.

As processor speeds have increased, the size of memory in a typical computer system has also increased drastically, since more powerful processors can handle larger programs and larger quantities of data. In addition, error-correction circuitry is now placed in the memory path to increase reliability. Memory-access speeds have improved over time, but the increased size of memory and the complexity of error-correction circuitry have meant that memory-access time has remained approximately constant. For example, a typical supercomputer system clock rate may have improved from roughly 8 ns to 4 ns to 2 ns over three generations. Over the same time period, memory-access times may have remained at approximately 96 ns. These times mean that the 8-ns processor accesses memory in 12 clocks, the 4-ns processor in 24 clocks, and the 2-ns processor in 48 clocks. A computer which randomly accessed data throughout memory would see almost no speed improvement from the faster system clock rate.

One solution has been to organize data into vectors, where each element (or datum) of a vector has similar operations performed on it. Computer designers schedule various portions of the memory to simultaneously fetch various elements of a vector, and these fetched elements are fed into one or more parallel pipelines on successive clock cycles. Examples of such designs are described in U.S. Pat. No. 4,128,880 issued Dec. 5, 1978 to Cray (the '880 patent), U.S. Pat. No. 4,661,900 issued Apr. 28, 1987 to Chen et al., and U.S. Pat. No. 5,349,667 issued Sep. 20, 1994 to Cray et al., each of which are assigned to Cray Research Inc., the assignee of the present invention, and each of which are hereby incorporated by reference.

For example, vector elements are loaded into pipelines to vector registers from successive element locations in the vector image in memory. A single CPU may include several vector processors which can operate in parallel. Overlapped with pipelined vector loads from memory, there might be other pipelines taking data from two other vector registers to feed a vector processor, with the resultant vector fed through a pipeline into a third vector register. Overlapped with these vector loads, there might be other pipelines taking data from two other vector registers to feed another vector processor, with the resultant vector fed through a pipeline into yet another vector register. In a well-tuned system of this design, using 2-ns pipeline clocks, the throughput can approach 500 million operations per second per single vector functional unit within a processor, with parallel functional units within a vector processor, and parallel vector processors within a multiprocessor system providing enhanced overall performance, even with relatively slow memory-access times.

In the system described in the '880 patent to Cray, a single counter associated with each vector register was used to address elements in that vector register for any one vector operation. Vector operations began with element number zero (the first element of a vector register) and proceeded until the number of elements specified by a vector-length register had been processed. In the process called "chaining," when a succeeding (or second) vector operation needed to use a vector as an operand the result from a preceding (or first) vector operation, the second operation started operation (or "issued") as soon as the result from the first vector operation arrived at the vector register. The second instruction was therefore "chained" to the first instruction. In systems constructed according to the '880 patent, result elements from the first vector operation executing in a first functional unit were passed on to a second functional unit simultaneously with being stored into the result vector register. Since there could be only one operation (either a read or a write) to the vector register occurring per clock cycle in such a system, chaining could only occur if the result write operation for the first instruction went to the vector register, and simultaneously that element value was passed to the second functional unit as if it were read from the same register. There was thus a single clock period during which the second instruction could issue (start execution) and be chained to the first instruction. This single clock period was termed the "chain slot time," and it occurred only once for each vector instruction. If the succeeding instruction could not issue precisely at the chain slot time because of a prior functional-unit or operand-register reservation, then the succeeding instruction had to wait until all element results of the previous operation had been stored in the vector-result register and that register's reservation was released. In addition, one succeeding element had to be accepted by the second functional unit every clock, since that was how the elements were made available by the first functional unit.

In the system described in the U.S. Pat. No. 4,661,900 to Chen et al. (the '900 patent), the chaining of the write of the first element from the first vector operation to the read of the first element of a subsequent vector operation was decoupled by providing two separate counters (one for reads and one for writes) associated with each vector register. The counters were used to address elements for read operations and elements for write operations, respectively, in that vector register. In the process called "flexible chaining," successive operations were no longer constrained to start exactly at the chain slot time, but could be issued at any time after the first result element was written to a result vector register which was being designated as an operand register for the successive operation. Again every vector operation would begin with element number zero (the first element of a vector register) and proceed until the number of elements specified by a vector-length register had been processed. The array of vector elements was divided into two arrays (even elements and odd elements). A read operation for an even-numbered element would go to the even array in the same clock period as a write operation for an odd-numbered element would go to the odd array. In the following clock period, the next read operation, now for the next, odd, read element would go to the odd array; and the next write operation, now for the next, even, write element would go to the even array. In this manner, two operations could be scheduled for each vector register every clock period.

In very-high-speed vector processors, such as the Cray Y-MP C90 manufactured by Cray Research Inc., the assignee of the present invention, a computer system includes a number of central processing units ("CPUs"), each of which may have more than one vector processor. In addition, the computer system includes a number of common memories which store the programs and data used by the CPUs. Vector data are often streamed or pipelined into a CPU, and so delays due to long access times can be compensated for by processing many elements on successive cycles as the result of a single request.

One method of enhancing the performance of vector data streaming through a vector processor is to monitor or track which elements of a particular vector register are available or valid, and to stream elements, as they become available, into an arithmetic/logical functional unit (ALFU) for processing by an arithmetic or logical vector operation. Referring to prior-art FIGS. 4 and 5, several successive vector operations may be performed by "flexibly chaining" operations, so that elements in a vector register, for example, are chained into a second operation as an "operand" as soon as they become available (or any time thereafter) in that vector register as a "result" from a first operation. One such system is described in the '900 patent mentioned above. Such an approach is of limited value in situations where data read into a vector register may arrive out-of-sequence (e.g., due to variable latency times in a memory).

What is needed is an improved vector chaining system for a vector computer system which compensates for variable latency times in a memory, and a method for increasing the performance of processing vector data into, through, and out of a vector processor.

SUMMARY OF THE INVENTION

The present invention teaches a method and apparatus for vector processing on a computer system. As the last element of a group of elements (called a "chunk") in a vector register is loaded from memory, the entire chunk is marked valid and thus made available for use by subsequent or pending operations.

The vector processing apparatus includes a plurality of vector registers, wherein each vector register holds a plurality of elements. For each of the vector registers, a validity indicator is provided wherein each validity indicator indicates a subset of the elements in the corresponding vector register which are valid. A chunk-validation controller is coupled to the validity indicators operable to adjust a value of the validity indicator in response to a plurality of elements becoming valid. An arithmetic logical functional unit (ALFU) is coupled to the vector registers to execute functions specified by program instructions. A vector register controller is connected to control the vector registers in response to program instructions in order to cause valid elements of a selected vector register to be successively transmitted to said ALFU, so that elements are streamed through said ALFU at a speed that is determined by the availability of valid elements from the vector registers.

According to one aspect of the present invention, the ALFU further comprises a processor pipeline to hold operand data for operations not yet completed while receiving operands for successive operations.

According to another aspect of the present invention, the ALFU also further comprises an address pipeline to hold element addresses corresponding to the operands for operations not yet completed while receiving element addresses corresponding to the operands for successive operations.

According to yet another aspect of the present invention, the computer system further comprises an operand path selector responsive to program instructions to selectively connect individual vector registers for transmitting data as operands through the ALFU, and a result path selector responsive to program instructions to receive results from the ALFU.

The vector processing method comprises the steps of holding a plurality of elements for each of a plurality of vector registers, indicating a subset of the elements which are valid in a validity indicator, adjusting a value of the validity indicator in response to a plurality of elements becoming valid, providing an arithmetic logical functional unit (ALFU), and controlling a vector register means in response to program instructions in order to cause valid elements of a selected vector register to be successively transmitted to the ALFU, so that elements are streamed through said ALFU at a speed that is determined by the availability of valid elements from the vector registers.

According to yet another aspect of the vector processing method of the present invention, the method further comprises the steps of selectively connecting individual vector registers to transmit elements as operands through the ALFU in response to program instructions, and receiving results from the ALFU in response to program instructions.

BRIEF DESCRIPTION OF THE DRAWINGS

FIG. 4 is a schematic diagram illustrating a prior-art functional unit pipeline.

DESCRIPTION OF THE PREFERRED EXEMPLARY EMBODIMENT

In the following detailed description of the preferred exemplary embodiments, reference is made to the accompanying drawings which form a part hereof, and in which are shown by way of illustration specific exemplary embodiments in which the invention may be practiced. It is to be understood that other exemplary embodiments may be utilized and structural changes may be made without departing from the scope of the present invention.

As memory subsystems become larger and more complex, and as processors become faster, the time contribution of each component of an operation becomes more important. In a multiprocessor system with multiple independent memory subsystems, vector elements may arrive from certain memory subsystems faster than from others, due to contention between and usage of various components. To maximize performance, it is desirable to take advantage of the early arrival of certain elements of a vector relative to the arrival of other elements. Thus, it is desirable to process elements of a vector as those elements became available, rather than being restricted to processing elements only in element-order, starting with element zero, as in the above-described systems.

Figure 1:
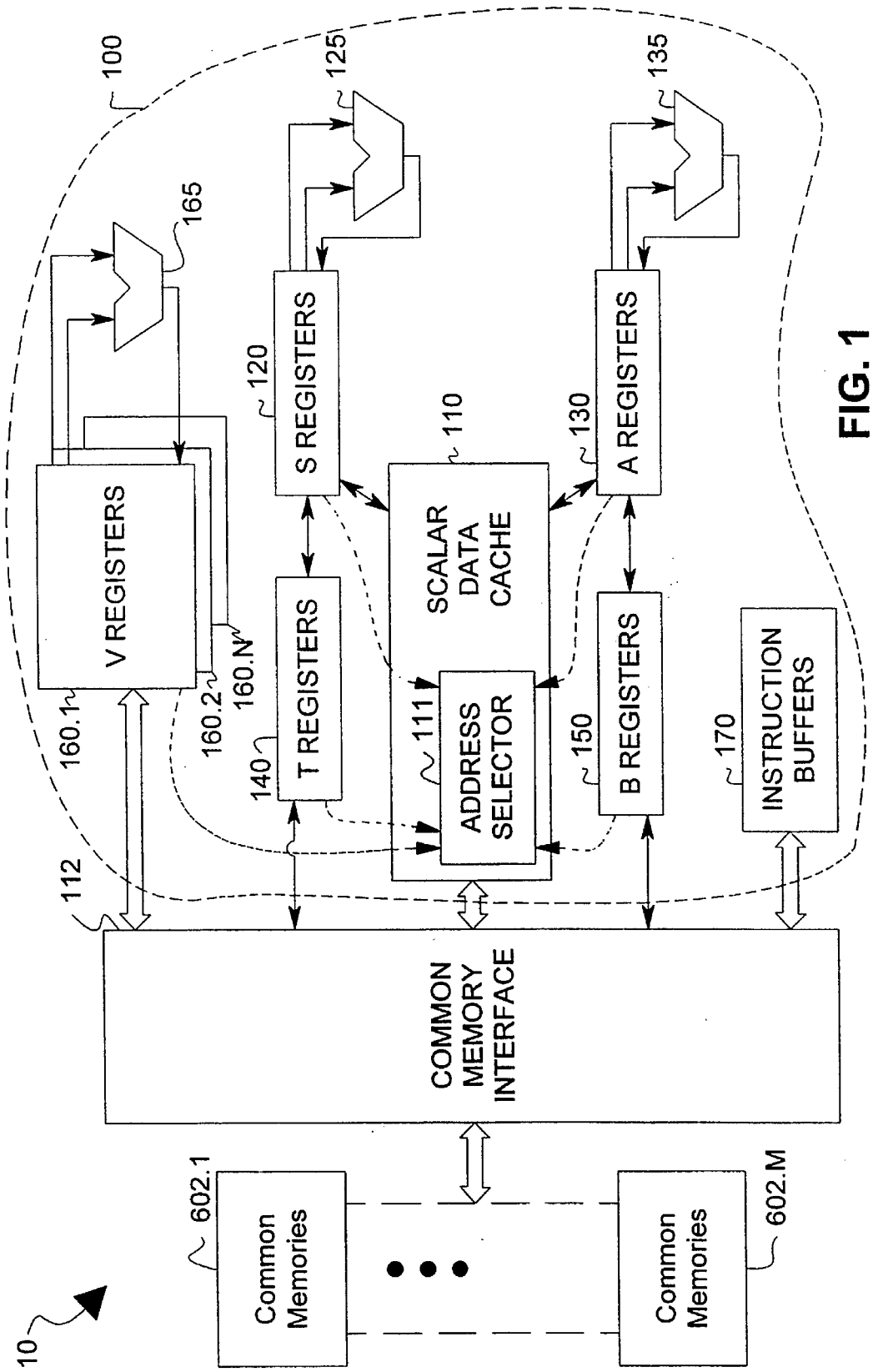
FIG. 1 is a schematic diagram illustrating an exemplary embodiment of the present invention.

FIG. 1 is a schematic diagram illustrating an exemplary embodiment of a scalar/vector supercomputer 10 constructed according to the present invention, comprising scalar/vector processor CPU 100 connected through a common memory interface 112 to common memories 602.1 through 602.M. "Memory" for common memories 602.1 through 602.M may include cache memories; main memories, such as those implemented with dynamic random access memories (DRAMs), static random access memories (SRAMs), synchronous dynamic random access memories (SDRAMs) and video random access memories (VRAMs); and mass storage devices such as hard magnetic disks, optical disks, and magnetic tape units, etc. In FIG. 1, CPU 100 comprises vector processor 165, scalar processor 125, address processor 135, vector registers 160.1–160.N, S registers 120, T registers 140, A registers 130, B registers 150, instruction buffers 170, scalar data cache 110, and address selector 111. Common memory interface 112 provides access for scalar/vector processor CPU 100 to a set of common memories 602. In one embodiment, common memories 602.1–602.M are also connected through common memory interface 112 to a plurality of other scalar/vector processor CPUs (not shown) similar to CPU 100, forming a multi-processor, multi-memory system.

Scalar data cache 110 provides a local cached copy of a subset of the data in the set of common memories 602 which can be quickly accessed by at least one of the registers in CPU 100. It may not be practical to make scalar data cache 110 accessible to all of the registers in CPU 100, since such access causes additional loading and wiring complexity. In the embodiment shown in FIG. 1, the scalar S registers 120 and the address A registers 130 can fetch from and write-through (also called store-through) the scalar data cache 110, while all other registers must access data directly from common memories 602 through common memory interface 112.

Scalar data cache 110 is described in more detail in co-pending application "Associative Scalar Data Cache with Write-Through Capabilities for a Vector Processor" assigned to the assignee of the present invention and hereby incorporated herein by reference.

In the design described in the '900 patent, separate counters (at least one for reads of elements from the vector register, e.g., read-address counter 812, and at least one for writes of elements to the vector register, e.g., write-address register 822) associated with each vector register are used to address elements for read operations and elements for write operations, respectively, in that vector register. In the prior-art process called "flexible chaining," successive operations are no longer constrained to start exactly at the chain slot time, but can instead be issued at any time after the first result element was written to a result vector register designated as an operand register for the successive operation. Every vector operation would begin with element number zero (the first element of a vector register) and proceed until the number of elements specified by a vector-length register had been processed. Elements would be fetched from memory and return to the vector registers in element-order (i.e., element zero followed next in time by element one followed next in time by element two, etc.).

The first mode of operation described is called read-following-write. Read operations (perhaps caused by subsequent instructions of a program running in the computer)

can be "chained" to occur after the write operation—that is, subsequent read operations which depend on prior results being written are forced to wait until the elements they need are written and valid. In one embodiment of such a system, the write-address register 822 is reset to zero at the start of a particular write operation to (a) indicate to the write-control circuitry that element number zero is to be written next, and (b) indicate to the read-control circuitry that element number zero (of even-element bank 810) and all higher-addressed elements (of banks 810 and 820) are invalid for use as operands since they have not yet been written to. When the write to element number zero is complete, then the write-address register 822 is incremented to one to (a) indicate to the write-control circuitry that element number one is to be written next, and (b) indicate to the read-control circuitry that element number one and all higher-addressed elements are invalid since they have not yet been written to. Once the element corresponding to the number in the vector-write-length register 836 for this operation has been written to, the write operation is considered complete. Thus, the write-address register 822 can be used as a validity indicator to indicate the number of elements that are valid and available for subsequent read operations, as well as indicating the state of completion of the write operation.

The second mode of operation described is called read-following-write. Write operations (perhaps caused by subsequent instructions of a program running in the computer) can be "chained" to occur after the read operation—that is, subsequent write operations which would overwrite operand elements being read by prior operations are forced to wait until the elements they need are read and no longer needed. The read counter 812 is reset to zero at the start of a particular read operation to (a) indicate to the read-control circuitry that element number zero is to be read out next, and (b) indicate to the write-control circuitry that element number zero and all higher-addressed elements may NOT be written to by any subsequent write operation since they have not been read from (i.e., the data in those elements are still needed). When the read from element number zero (from even-element bank 810) is complete, then the read counter 812 is incremented to one to (a) indicate to the read-control circuitry that element number one is to be read from next, and (b) indicate to the write-control circuitry that element number zero may now be written, but element number one and all higher-addressed elements may NOT be written to since they have not yet been read from. Once the element corresponding to the number in the vector-read-length register 835 for this operation has been read from, the read operation is considered complete.

Thus, a read operation is allowed to proceed until the read counter reaches the element pointed to by a previously scheduled (and currently operating) write operation to that vector register. That is, each element up to the element pointed to by the write-address register 822 has been written with data and is valid, while higher-addressed-elements are not yet valid. Similarly, a write operation is allowed to proceed until the write-address register 822 reaches the element pointed to by a previously scheduled (and currently operating) read operation to that vector register. In that case, each element up to the element pointed to by the read counter 812 has been read from, and is now available for writing over, while higher-addressed-elements are not yet available.

In prior-art systems, processing of elements and indications of which elements are available vs. still needed depends on elements arriving in element-order: the write counter points to the next element to be written, and the lowest-numbered invalid element. As noted previously, a system which is constrained to sequential acceptance of vector elements is not capable of efficient operation when used with memories having variable latency timings.

In the embodiment of present invention shown in FIG. 1, a scalar/vector supercomputer 10 comprises one or more scalar/vector processors CPU 100 connected through a common memory interface 112 to common memories 602.1 through 602.M, collectively called common memory 602. In one such embodiment, common memories 602.1–602.M are also connected through common memory interface 112 to a plurality of other scalar/vector processor CPUs 100 (not shown) similar to CPU 100, forming a multi-processor, multi-memory system. Common memories 602.1–602.M are configured so that one of the plurality of scalar/vector processors may schedule operations to a particular common memory 602.n to the exclusion of other scalar/vector processors, generally locking that memory for only a short period of time. More than one CPU 100 may simultaneously have operations in process to or from the common memories 602. In some embodiments it is desirable to add memory subsystems to the common memories 602 which have either faster or slower access timings.

Figure 5:
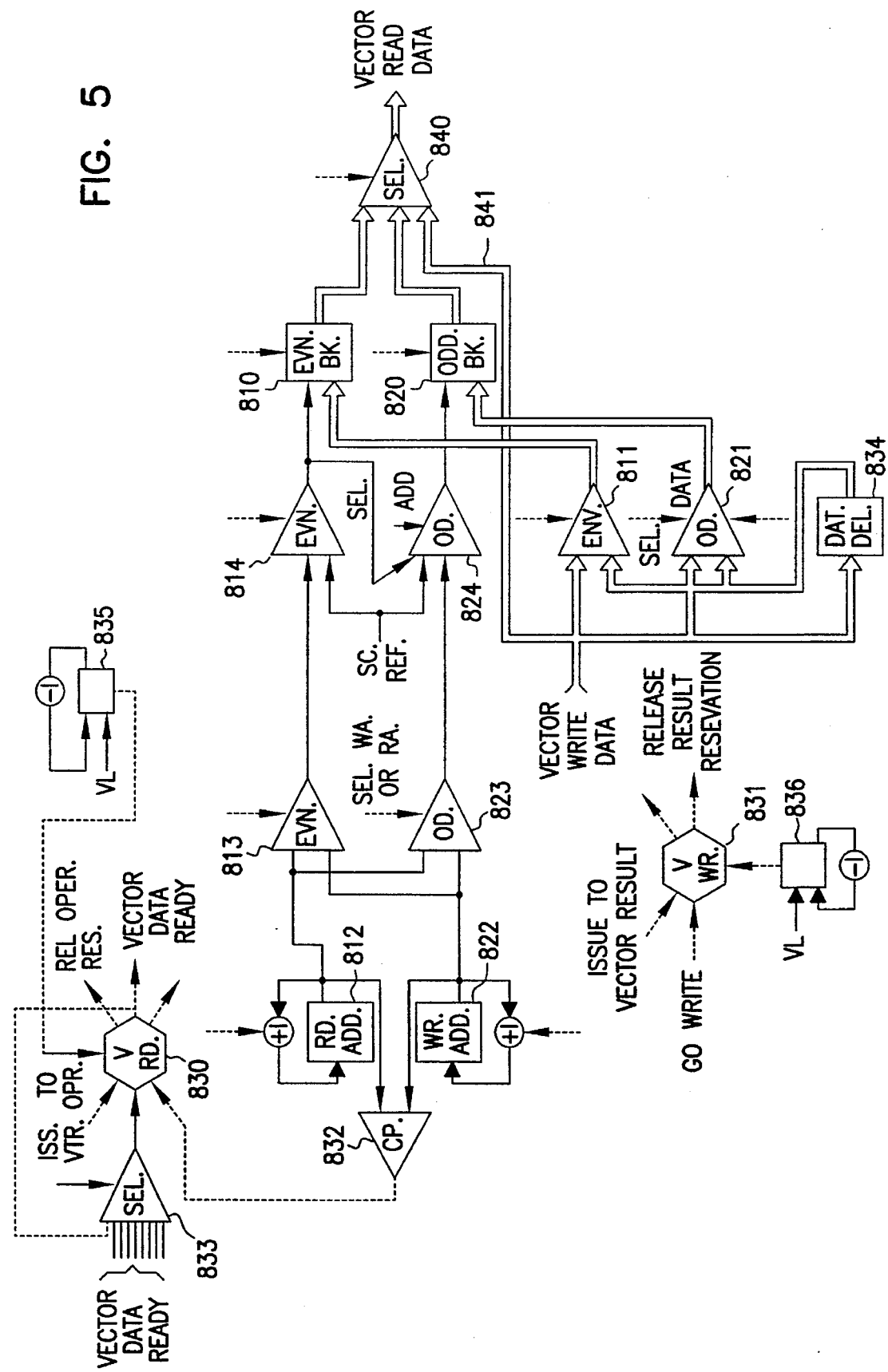
FIG. 5 is a schematic diagram illustrating a prior-art vector register array and control.

Due to a number of factors such as CPU contention for access to a particular memory subsystem, and the access-time variations of various memory subsystems, there is a range of time periods during which data may return to a vector register from the common memories 602. This means that elements of a vector, which are generally spread across several memory subsytems, can and very often do return out-of-element-order to the CPU 100 which requested the vector. The system shown in FIG. 5, where write-address register 822 increments by one for each arriving element read from memory, is not capable of accommodating elements arriving out-of-element-order.

Figure 2:
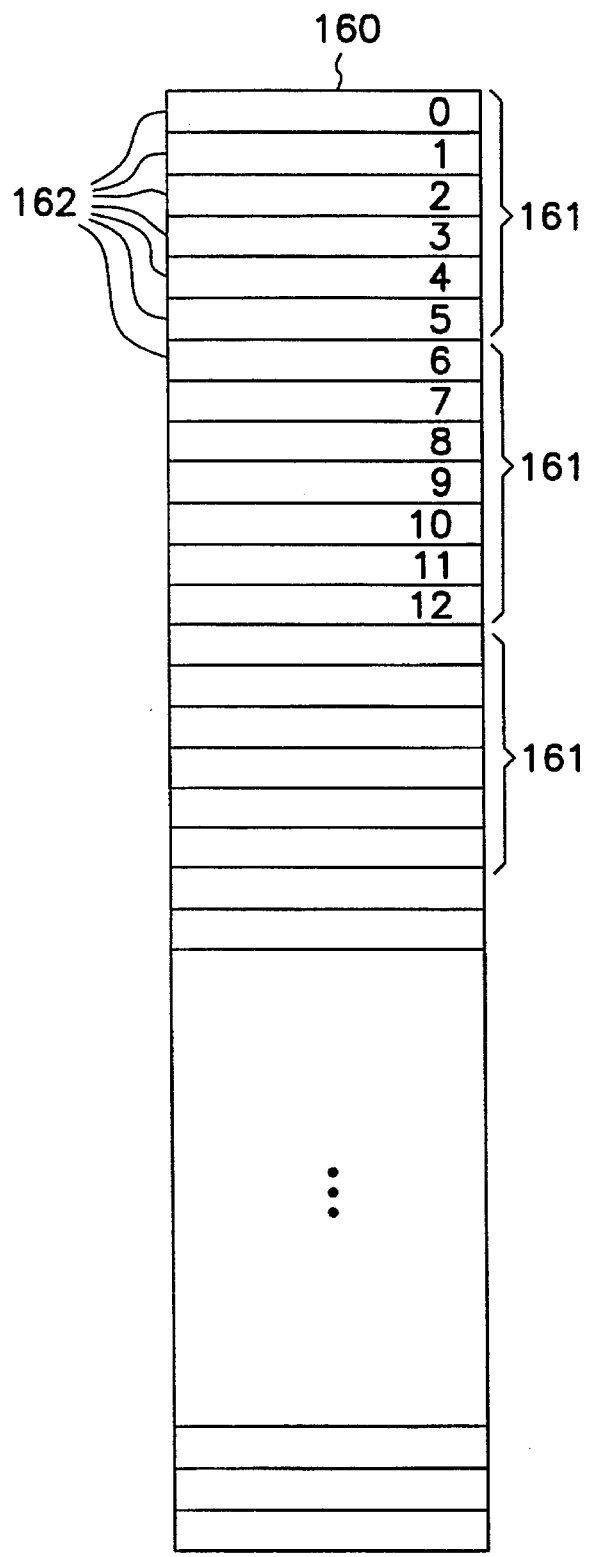
FIG. 2 is a schematic diagram illustrating a vector register 160 comprising elements 162 and chunks 161 according to one exemplary embodiment of the present invention.

The present invention provides a method and a mechanism, termed "chunk chaining," to improve performance and handle vector elements which arrive out-of-element-order. Referring to FIGS. 1 and 2, each of the vector registers 160.1 –160.N (each individually called vector register 160) contains a plurality of chunks 161, with each chunk 161 comprising one or more elements 162. A chunk can be, but need not be, the same size as other chunks. On a read operation loading elements 162 into a vector register 160, the elements are allowed to arrive at vector register 160 in a random time order. In one embodiment, each arriving element is accompanied by a designation of the register and the element within that register that the arriving element is to be loaded into. Once all of the elements 162 of a particular chunk 161 are loaded into the vector register 160, that entire chunk 161 is marked as valid, and each element 162 therein is then usable by a function or process seeking to use that register 160 as an operand. On a memory-write operation, once all of the elements 162 comprising a particular chunk 161 are written from the vector register 162, the entire chunk 161 is marked as invalid (meaning "now empty and usable as a destination"). It can then be used by a process or memory operation waiting to load new elements 162 into that register 160.

In most situations, the elements 162 of a vector in a vector register 160 can be processed, for any vector operation, in any order without affecting the result obtained, as long as all elements 162 up to the specified vector length of the vector are processed. By providing validity (and thus availability) indications on a chunk basis, the vector chunk-chaining design of the present invention allows handling of elements of a vector which arrive out-of-order and at random times, and takes advantage of the enhanced performance available if elements which arrive "early" are stored in vector register 160 before elements which arrive "late," whatever their element-order. At one extreme, each chunk comprises only a single element, and every element in the entire vector can be processed a totally-random order, with each element being processed as soon as it becomes available, without regard to its order within the vector. At the other extreme, the entire vector (up to the length indicated in the vector-length register) is one chunk, and the entire register 160 is marked valid or available as one piece.

Figure 6:
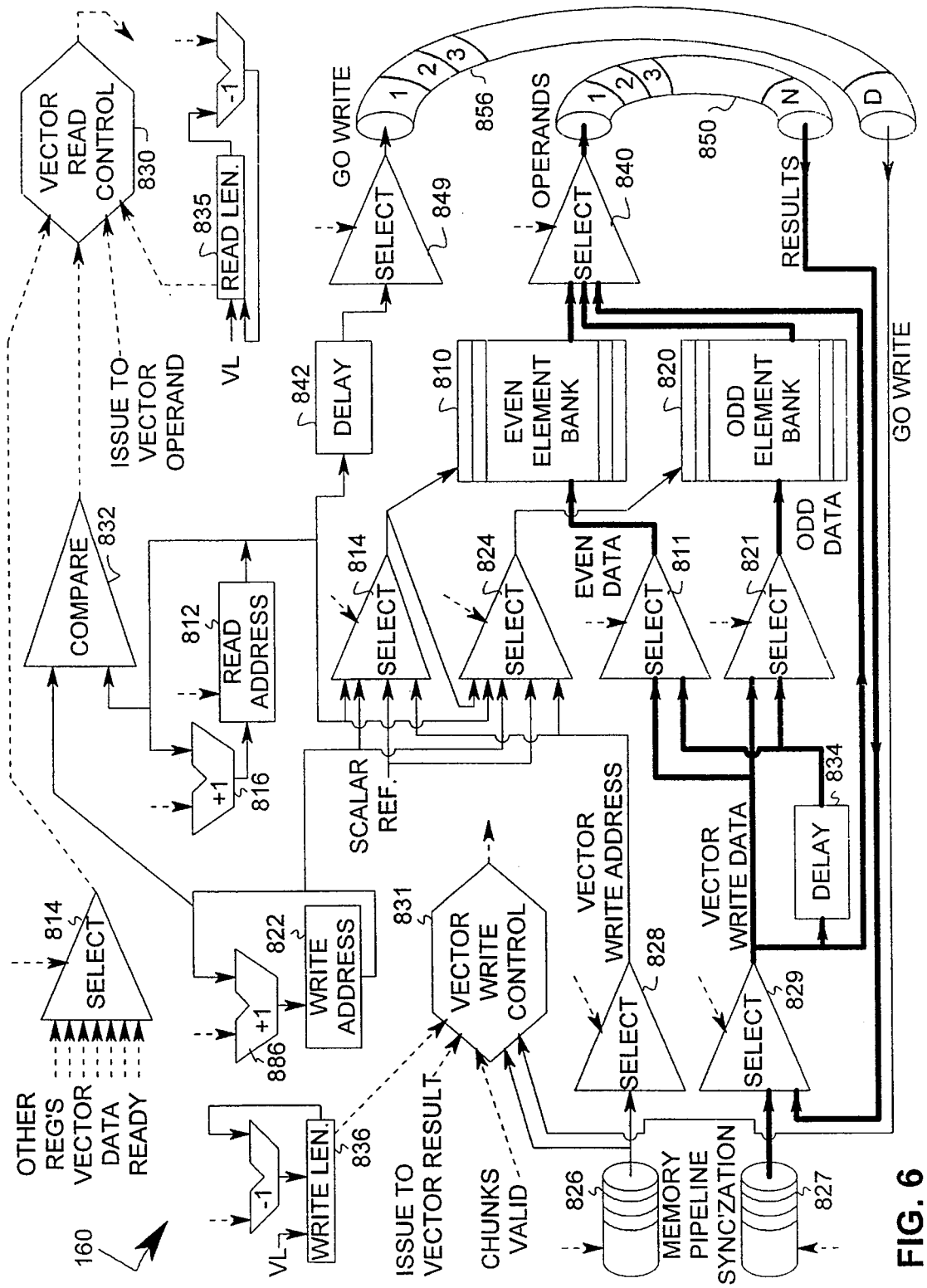
FIG. 6 is a schematic diagram illustrating details of one exemplary embodiment of the array and controls of a vector register 160 shown in FIG. 1.

In the embodiment shown in FIG. 6, the internal processing of a vector is chained in a manner much the same as the approach used in the '900 patent, with the exceptions noted hereinafter. The diagram of FIG. 6 schematically shows the flow and control for a single vector register 160, and corresponding logic is repeated for each vector register 160.1–160.N. The even elements of the vector are held in even-element bank 810, and the odd elements are held in odd-element bank 820. As valid elements are placed in banks 810 and 820, vector write controller 831 adjusts the value in write-address register 822 to reflect the largest address of the contiguous valid elements of a particular vector register 160. (Some elements with higher addresses, having arrived out-of-order, may also be valid.) Thus, write-address register 822 can be used as a validity indicator for indicating a subset of elements in vector register 160 each of which is valid; since these elements are all valid, they can be used as operands by a ALFU operation. At the same time, at least some of the elements outside this subset are invalid, and should not be used as operands until they become valid.

For example, data for elements 162 arriving from common memories 602 arrive through memory-data pipeline/synchronizer 827 accompanied by a corresponding element address arriving through memory-element-address pipeline/synchronizer 826. Vector write controller 831 adjusts the delay of pipeline/synchronizers 826 and 827 so there are no timing conflicts between elements arriving through those pipelines and elements arriving through functional-unit pipelines 856 and 850.

A vector operation using elements 162 of a particular vector register 160 as operands (i.e., reading elements from the register after they are written) would start by activating an issue-to-vector-operand signal to vector read controller 830 in order to reserve this vector register 160 as an operand for the duration of this vector operation. This operand reservation is used to prevent subsequent operations from changing values in elements of the vector before those elements are referenced as operands by the operand-reserving operation. Vector-read-length register 835 is loaded with the number of elements in the vector. Read-address counter 812 is loaded with zero (i.e., the address of the first element to be read). A previous operation would have set up this vector register 160 as a result register (e.g., an instruction would designate this register as the destination for a memory read, or as a result for a vector operation). As elements are made valid (e.g., by being loaded from a memory read), vector write control 831 updates write-address register 822 to reflect the maximum address which has been written and made valid. Vector read controller 830 can then read elements from banks 810 and 820 starting at element zero, and continuing up to the element indicated in write-address register 822.

One vector arithmetic/logical functional unit (VALFU) (165 on FIG. 1) is reserved for this operation. There are several VALFUs in each CPU 100; each VALFU can operate in parallel with other VALFUs so that simultaneous vector operations can occur during each CPU cycle. VALFU 165 is represented by processor pipeline 850 which has N sequential stages. Go-write pipeline 856, which has D sequential stages, operates in conjunction with processor pipeline 850 such that: for each element operand fed into processor pipeline 850 by element selector 840, a corresponding go-write signal is fed into go-write pipeline 856 by go-write selector 849. The number of stages, D, in go-write pipeline 856, is set to equal the number of stages, N, in processor pipeline 850. Thus, as each result element emerges from processor pipeline 850, a corresponding go-write signal simultaneously emerges from go-write pipeline 856 into vector write controller 831 and is used to control the writing of the result elements into the "result" vector register 160. Vector write controller 831 updates write-address register 822 to indicate the address of the element being written.

As result elements 162 emerge from pipeline 850 into the result vector register 160, the result elements are fed through vector-write-data selector 829, selectably through element delay circuit 834, to even-write-data selector 811 and odd-write-data selector 821, and then to even-element bank 810 and odd-element bank 820 for even-numbered and odd-numbered elements, respectively.

Figure 3A:
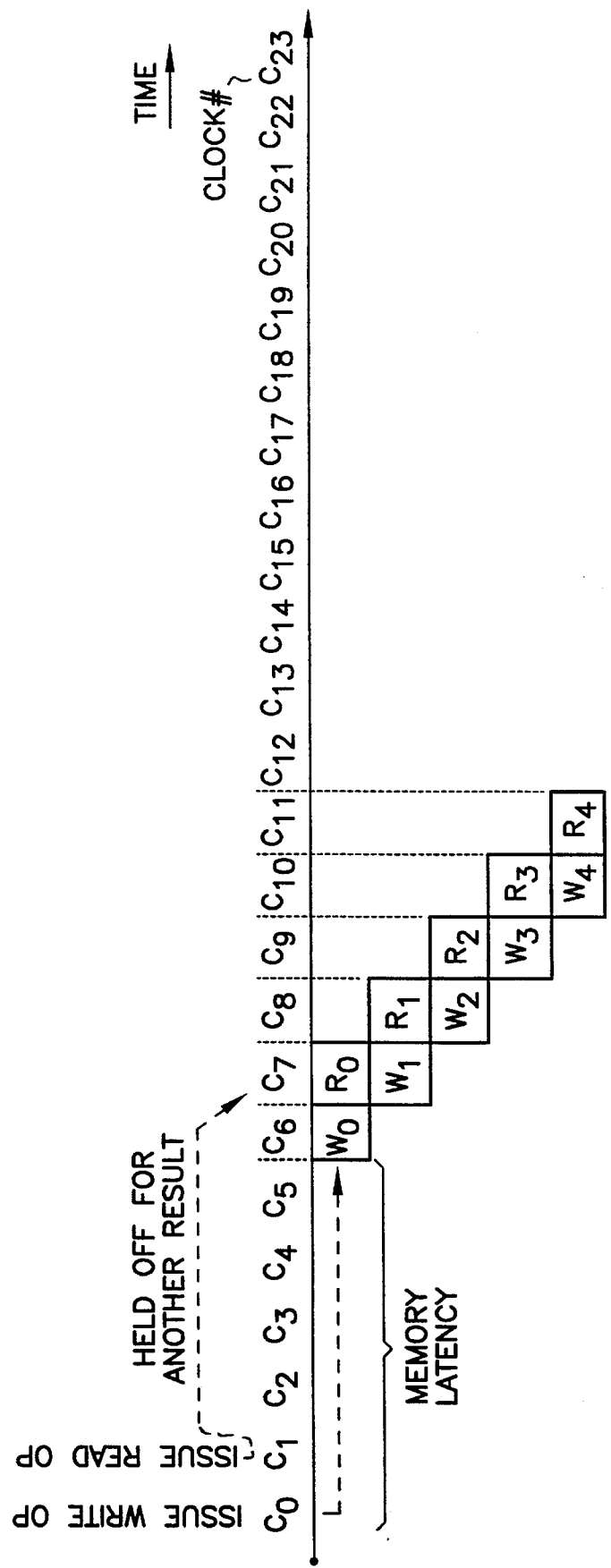
FIG. 3A shows a timing diagram for an operation which fetches vector elements from memory into a vector register, and then immediately after another operation reads those elements as operand elements.

Reads and writes of elements to banks 810 and 820 are alternated so that one read and one write are performed in each CPU clock cycle. For example, during one clock cycle n, even element 0 can be written; during the next clock cycle n+1, odd element 1 can be written and simultaneously even element 0 can be read; during the next clock cycle n+2, even element 2 can be written and simultaneously odd element 1 can be read, and so on. During each clock cycle, up to two bank operations can be performed—one read-element operation to one bank and one write-element operation to the other bank. During the following clock cycle, up to two bank operations can be performed—generally a write to the bank which previously performed the read, and a read to the bank which previously performed the write. A subsequent read-vector operation which goes through the element banks can follow (as little as one element behind—i.e., reading element N while writing element N+1, and as much as an indefinite time later—i.e., writing all elements of the result vector into a vector register 160 before reading the first element of the operand vector from that vector register 160) the write-vector operation which provides the elements needed. FIG. 3A shows a timing diagram for an operation which fetches data (i.e., vector elements) from memory to write into a vector register 160 issuing at clock cycle $C_0$. A vector operation which reads these data from the vector register 160 would issue at clock cycle $C_1$, but is held-off, waiting for another required operand until clock cycle $C_7$. After a time corresponding to the memory latency, vector elements begin to arrive at clock cycle $C_6$ (element zero is written to even-element bank 810 at clock cycle $C_6$), with successive elements arriving on successive clock cycles thereafter. At clock cycle $C_7$ element zero is read from even-element bank 810 and element one is written to odd-element bank 820. At clock cycle $C_8$ element one is read from odd-element bank 820 and element two is written to even-element bank 810, and so on.

Figure 3B:
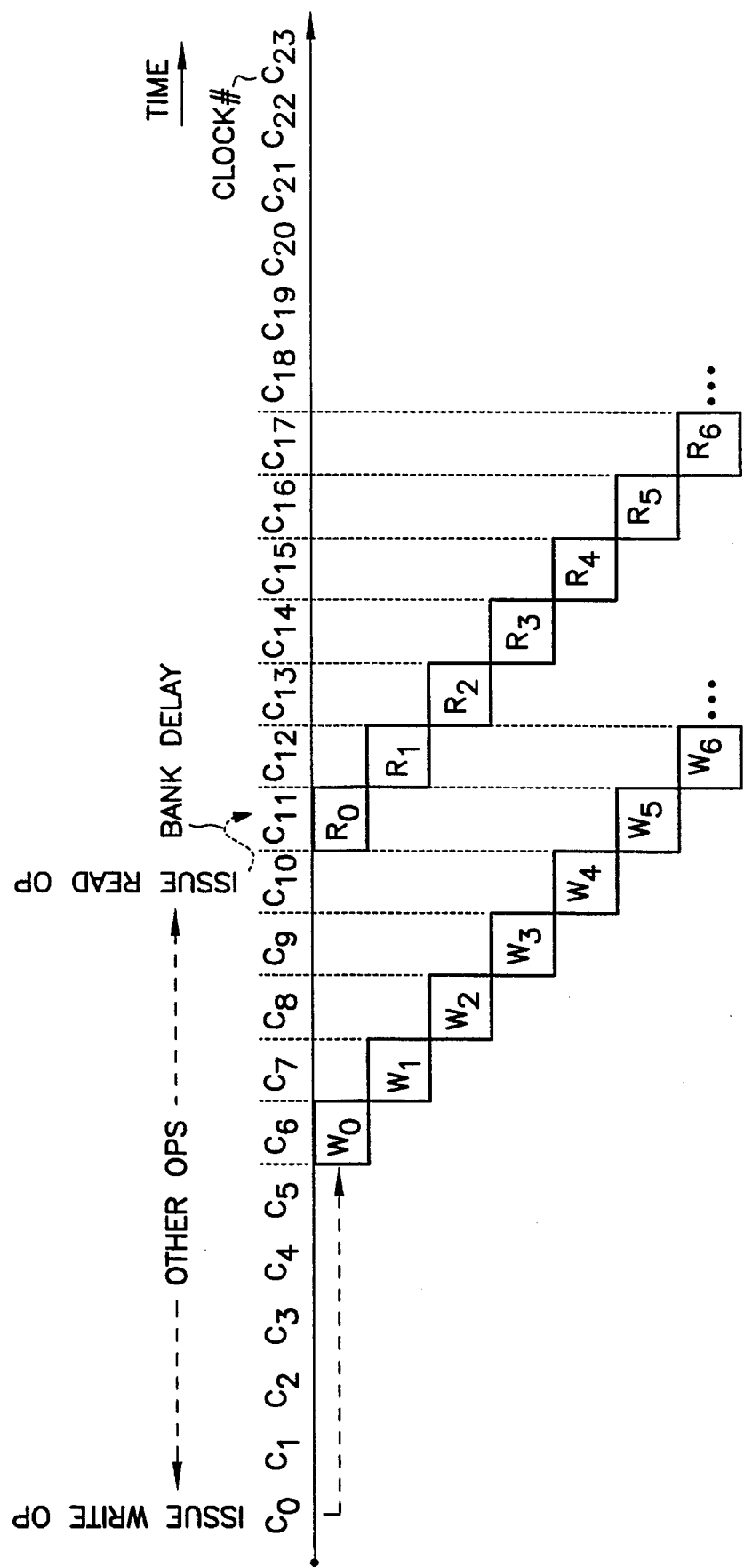
FIG. 3B shows a timing diagram for an operation which fetches vector elements from memory into a vector register, and then several clock cycles later another operation reads those elements as operand elements.

FIG. 3B shows a timing diagram for an operation which fetches data from memory to write into a vector register 160 issuing at clock cycle $C_0$. A vector operation which reads these elements from the vector register 160 would issue at clock cycle $C_{10}$, but is held-off, waiting for the even-element bank 810 (which is busy writing element four at clock cycle $C_{10}$) to become available for one clock until clock cycle $C_{11}$.

After a time corresponding to the memory latency, vector elements begin to arrive from memory at clock cycle $C_6$ (element zero is written to even-element bank 810), with successive elements arriving on successive clock cycles thereafter. At clock cycle $C_7$ element one is written to odd-element bank 820. At clock cycle $C_8$ element two is written to even-element bank 810, and so on. At clock cycle $C_{10}$ element four is written to even-element bank 810, while the read operation which would otherwise issue (and read element zero) must be held-off until the even-element bank 810 becomes available at clock cycle $C_{11}$. At clock cycle $C_{11}$ element zero is read from even-element bank 810 and element five is written to odd-element bank 820, and so on.

Figure 3C:
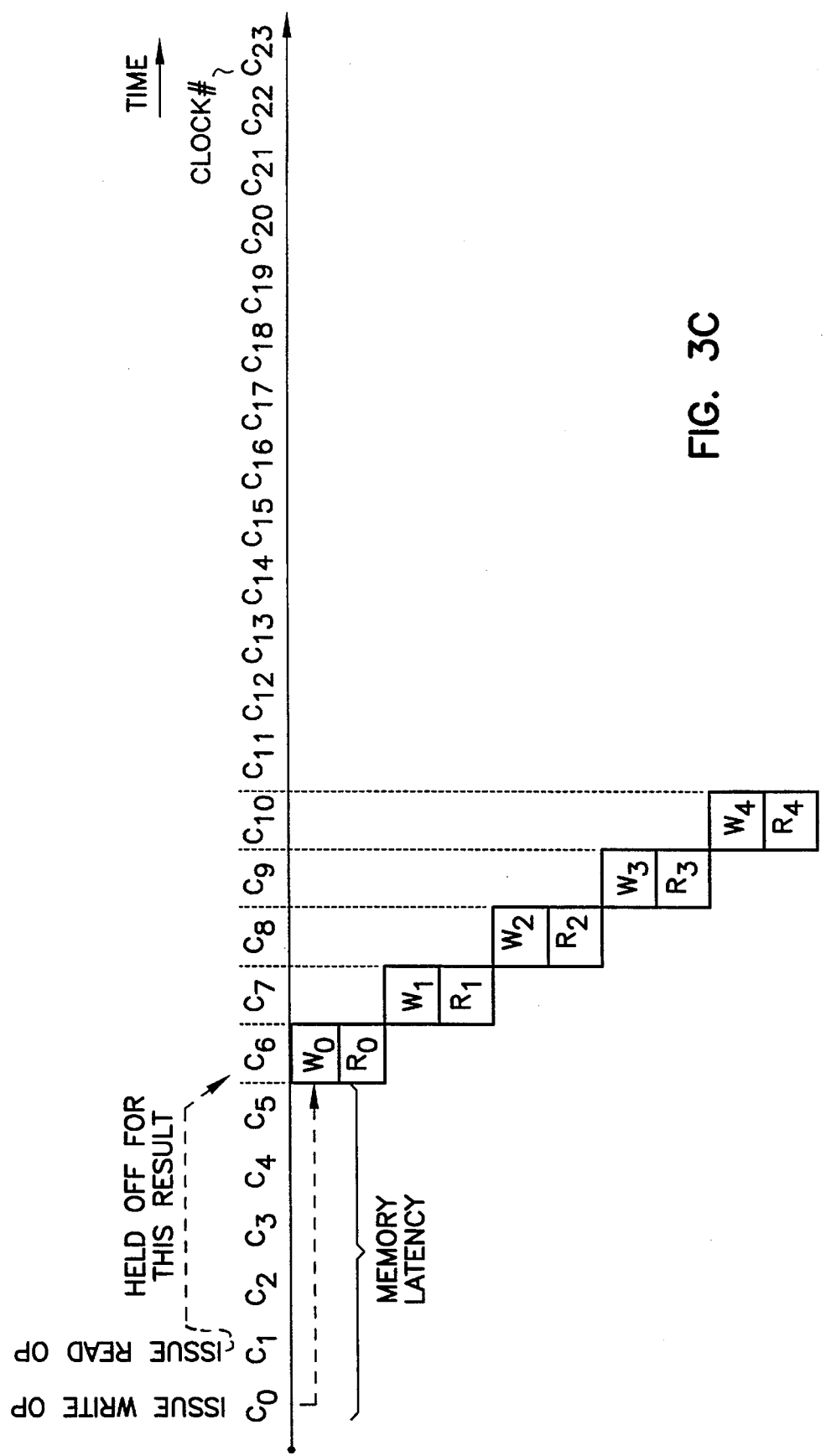
FIG. 3C shows a timing diagram for an operation which fetches vector elements from memory into a vector register, and another operation uses those elements as operand elements in the same cycles as the elements are written to the element array.

Alternatively, using the data path from vector-write-data selector 829 to read-element selector 840, a subsequent read which goes around the element banks can "follow" simultaneously with the write-vector operation which provides the elements needed (an even-element operand is provided from the even-element result in the same clock cycle); however, in this scenario the other operands and VALFUs required must be immediately available with the result elements being chained as operands. FIG. 3C shows a timing diagram for an operation which fetches data from memory to write into a vector register 160 issuing at clock cycle $C_{10}$. An operation which reads those elements from the vector register 160 would issue at clock cycle $C_1$, but is held-off, waiting for this operand until clock cycle $C_6$. After a time corresponding to the memory latency, vector elements begin to arrive at clock cycle $C_6$ (element zero is written to even-element bank 810 at clock cycle $C_6$), with successive write elements arriving on successive clock cycles thereafter. Also at clock cycle $C_6$ element zero is used as the element zero operand for the read operation. At clock cycle $C_7$ element one is written to odd-element bank 820 and used as the element one operand for the read operation. At clock cycle $C_8$ element two is written to even-element bank 820 and used as the element two operand for the read operation, and so on.

Figure 3D:
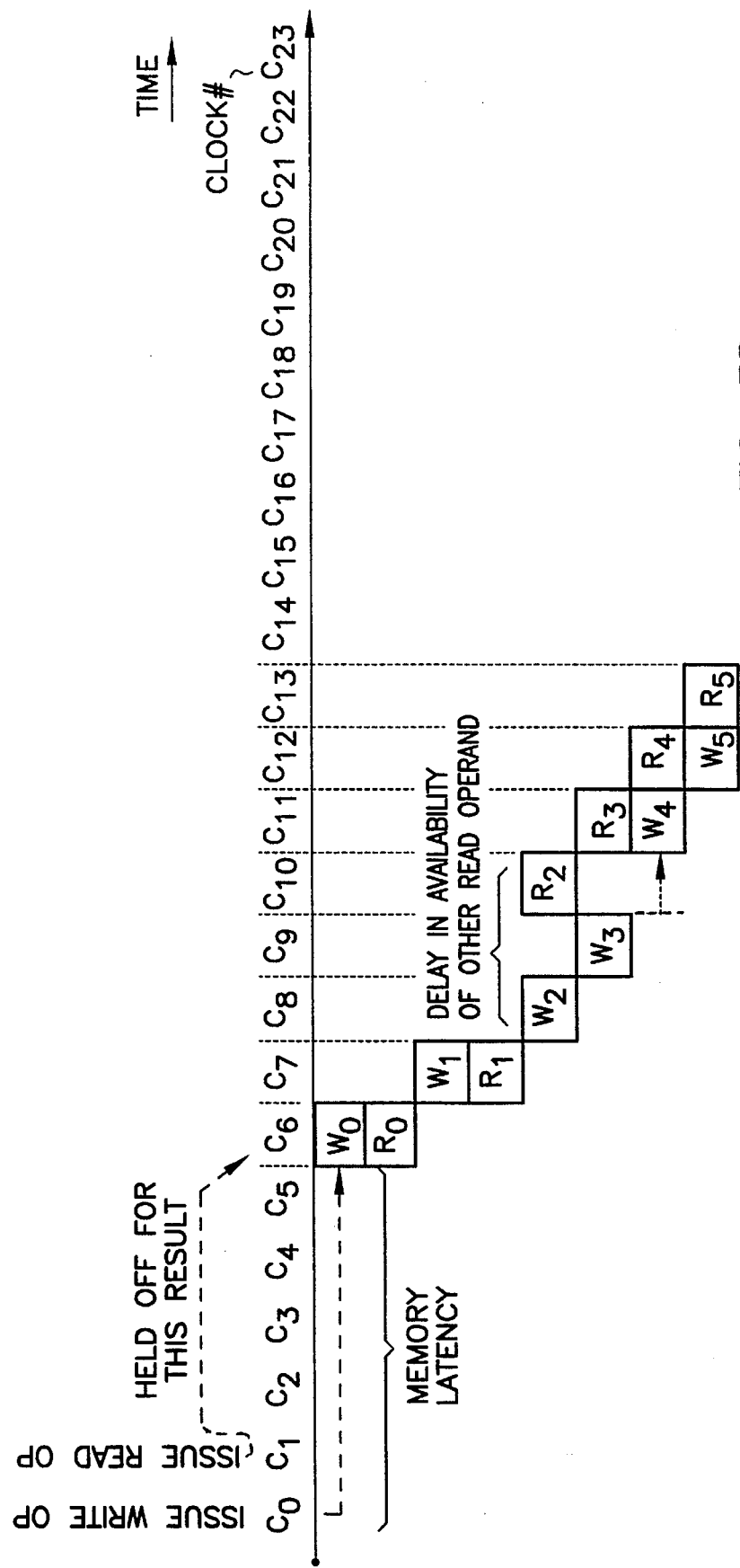
FIG. 3D shows a timing diagram for an operation which starts in the mode shown in FIG. 3C and later changes to the mode shown in FIG. 3A.

If a conflict or some other factor delays the availability of the other operand for subsequent elements of the vector, this alternative scenario reverts to the above-described even-odd route through the element banks 810 and 820. FIG. 3D shows a timing diagram for such a scenario, where at clock cycle $C_8$, the datum for element two of another operand required for the read operation is delayed two clocks and arrives instead at clock cycle $C_{10}$. Both operands of a two-operand, one-result VALFU operation must be fed into the respective inputs of the VALFU pipeline simultaneously. Therefore, since the other operand element two is not available until clock cycle $C_{10}$, the read for element 2 of this operand must similarly be delayed until clock cycle $C_{10}$. Also at clock cycle $C_{10}$, the write datum for element four is arriving, but must be delayed one clock (by delay circuit 834 of FIG. 6) and written instead at clock cycle $C_{11}$, since read element two and write element four both use even-element bank 810. Each successive conflicting write element is similarly delayed one clock cycle.

As each element is read, the vector-read-length register 835 is decremented by one. When vector-read-length register 835 reaches zero (all of the elements for this operation have been processed), the operand reservation is released.

A vector operation using elements 162 of a particular vector register 160 as results (i.e., writing elements to the register) would start by activating an issue-to-vector-result signal to vector write controller 831 in order to reserve this vector register 160 as a result register for the duration of this vector operation. This operand reservation is used to prevent subsequent operations from reading values from elements of this vector before those elements are written as results by the result-reserving operation. Vector-write-length register 836 is loaded with the number of elements in the vector. Write-address counter 822 is loaded with zero (i.e., the address of the first element to be written). Elements coming from a processor pipeline 850 are accompanied by a go-write signal coming from a go-write pipeline 856; the go-write signal controls writing elements and incrementing the write-address counter 822. Elements coming from a memory-element pipeline 827 are accompanied by a vector write-address signal coming from memory-element-address pipeline 826; the vector write-address signal controls writing elements, HOWEVER, the write-address counter 822 must be handled differently, as described below.

As each element is written, the vector-write-length register 836 is decremented by one. When vector-write-length register 836 reaches zero (all of the elements for this operation have been written), the result reservation is released.

CHUNK CHAINING

Because elements arrive from memory out-of-element-order, vector write-address counter 822 cannot be merely incremented as each element arrives. Vector write-address counter 822 is used by subsequent operations to indicate the extent of valid elements in vector register 160, as described above. Vector write-address counter 822 must thus contain the maximum valid contiguous address which has been written by the memory read/vector write operation. Subsequent read operations can then use any and all elements up to the value contained in vector write-address counter 822 as operands.

Figure 3E:
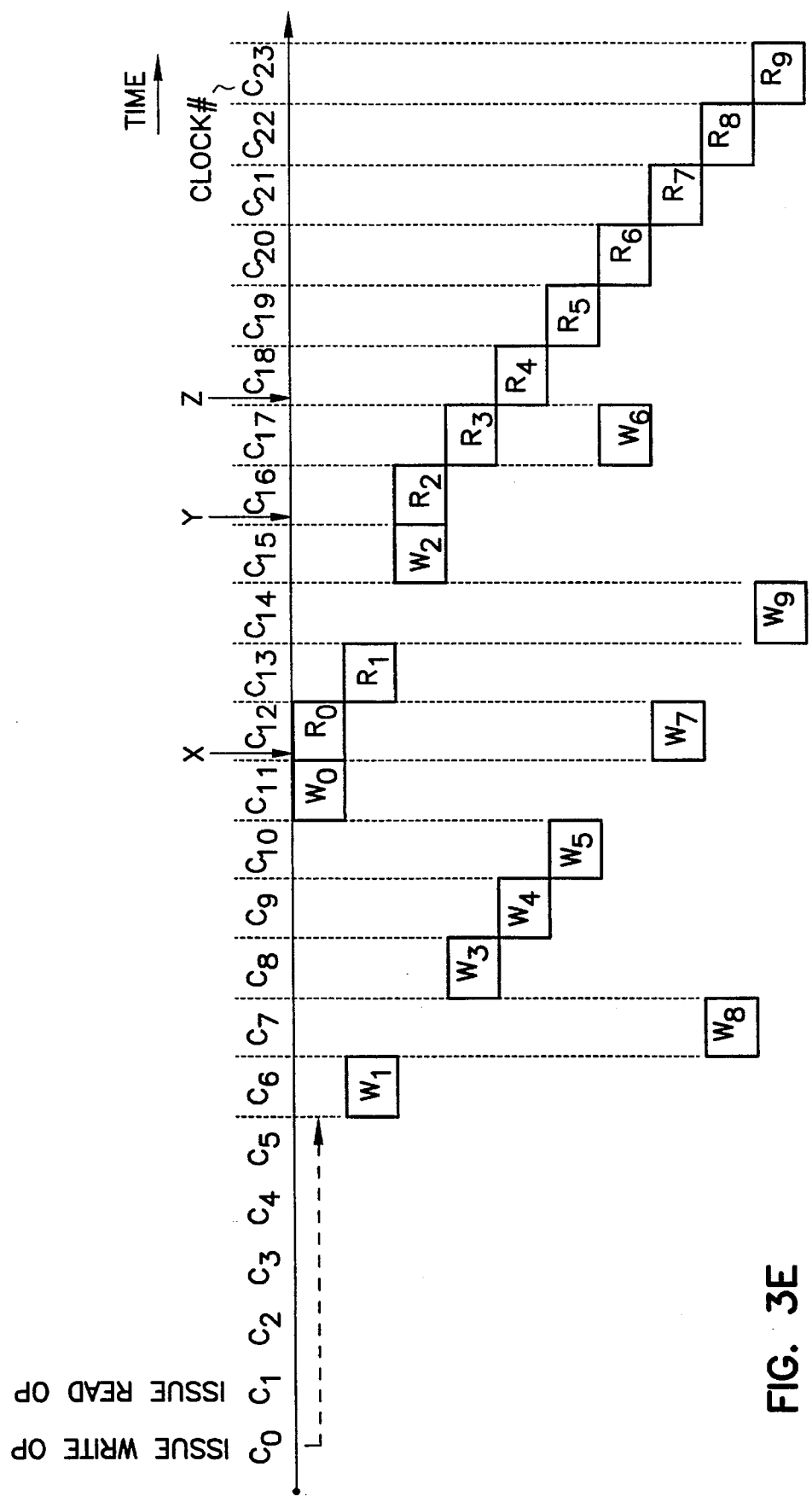
FIG. 3E shows a timing diagram for an operation which fetches vector elements from memory into a vector register wherein the arriving elements arrive out-of-element-order, and then another operation, using chunk chaining according to the present invention, reads those elements as operand elements.

For example, referring to FIG. 3E, if at time X, elements 1, 8, 3, 4, 5, and 0 had arrived and been written into vector register 160 in that order, then vector write-address counter 822 could, at most, have a value of 1. Element 2 had not yet arrived, and must not be used as an operand in subsequent operations until it does. If at later time Y, elements 7, 9 and 2 had also arrived and been written into vector register 160 in that order, then vector write-address counter 822 could, at most, have a value of 5. Element 6 had not yet arrived, and must not be used as an operand in subsequent operations until it does. If at later time Z, element 6 had also arrived and been written into vector register 160, then vector write-address counter 822 could, at most, have a value of 9, since all elements 0–9 are then valid. At time X, a chunks-valid signal to vector write controller 813 can indicate that the "chunk" of elements through element 1 was valid. At time Y, a chunks-valid signal to vector write controller 813 can indicate that the "chunk" of elements through element 5 was valid. At time Z, a chunks-valid signal to vector write controller 813 can indicate that the "chunk" of elements through element 9 was valid.

In one embodiment, each vector register 160 (FIG. 2) comprises sixteen chunks 161, and each chunk 161 comprises eight elements 162 (each chunk 161 is the same size), for a total of one-hundred twenty-eight elements 162 per vector register 160. FIG. 8 shows one embodiment of a chunk-validation controller 500. Memory interface 112 contains a group of sixteen chunk counters 116 for each destination register which can have an outstanding fetch operation in progress. Destination-indication register 118 indicates for which destination register this group of chunk counters is used. As each element arrives from common memories 602, a corresponding indication of both the destination register and the element address is coupled to chunk-counter-selection circuit 114, which increments the chunk counter corresponding to this destination register and element address. At the start of a vector fetch from memory, the counter for each complete chunk to be fetched is set to zero. As each element 162 for a particular chunk 161 is fetched, the corresponding chunk counter is incremented by one. When a chunk counter reaches eight (all elements for that chunk have been fetched), a chunk-valid signal (indicating that this chunk for this register is now valid) is sent to vector write controller 831. In one such embodiment, this signal goes to chunk valid bit (CVB) array controller 131, which then sets the appropriate bit in CVB array 133. In one such embodiment, CVB array 133 is comprised of a sixteen-by-eight bit array corresponding to the validity indications for each of sixteen chunks 161 in each of eight vector registers 160. Encoders 135 provide a write-address value corresponding to the element indicated as valid by CVB array for each vector register 160. Referring to the embodiment of FIG. 6, this write-address value is fed from vector write controller 831 to write-address register 822. Referring to the embodiment of FIG. 7, this write-address value is fed from vector write controller 831 to maximum-valid-address register 825. Thus, the maximum-valid-address register 825 can be used as a validity indicator to indicate the number of elements that are valid.

Figure 9:
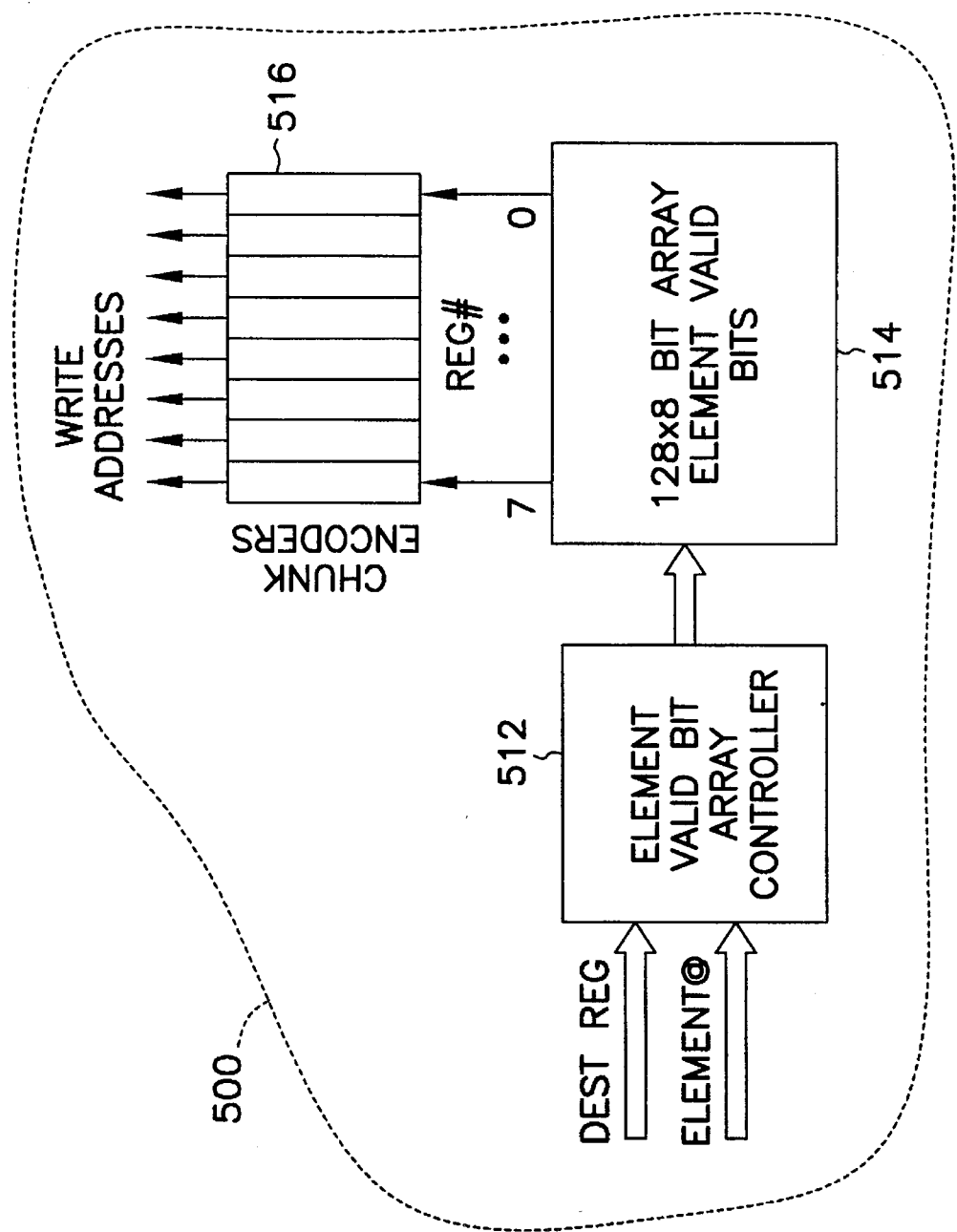
FIG. 9 is a schematic diagram illustrating details of another exemplary embodiment of a chunk-chaining controller.

In another embodiment, shown in FIG. 9, chunks of arbitrary size are accommodated. FIG. 9 shows this alternate embodiment of a chunk-validation controller 500. As each element arrives from common memories 602, a corresponding indication of both the destination register and the element address is coupled to element validity bit (EVB) array controller 512, which sets individual bits in EVB array 514 corresponding to this destination register and element address. At the start of a vector fetch from memory, all EVB array bits corresponding to the vector register 160 to be fetched are set to zero. As each element 162 is fetched, the corresponding EVB array bit is set to one. In one such embodiment, EVB array 514 is comprised of a one-hundred-twenty-eight-by-eight bit array corresponding to the validity indications for each of one-hundred-twenty-eight elements 160 in each of eight vector registers 160. Encoders 135 provide a write-address value corresponding to the element indicated as valid by EVB array for each vector register 160. Because chunk encoders 516 can "jump" to the largest contiguous valid element in a "chunk" of any arbitrary size, one such embodiment can accommodate chunks of varying sizes. One such embodiment can be used with either the embodiment shown in FIG. 6 or that shown in FIG. 7. Referring to the embodiment of FIG. 6, this write-address value from each encoder 516 is fed from vector write controller 831 to write-address register 822. Referring to the embodiment of FIG. 7, this write-address value is fed from vector write controller 831 to maximum-valid-address register 825.

Figure 7:
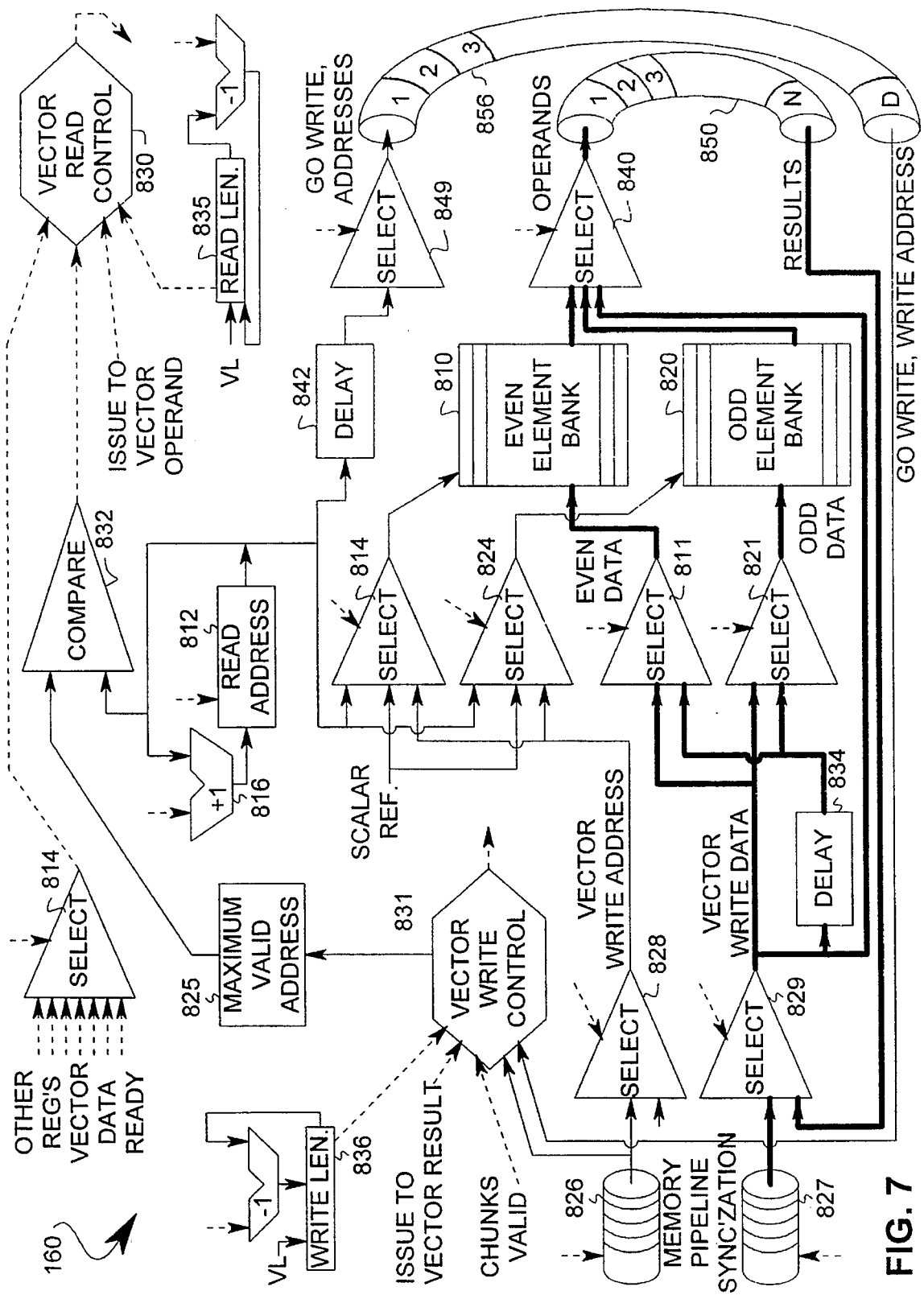
FIG. 7 is a schematic diagram illustrating details of another exemplary embodiment of the array and controls of a vector register 160 shown in FIG. 1.
Figure 8:
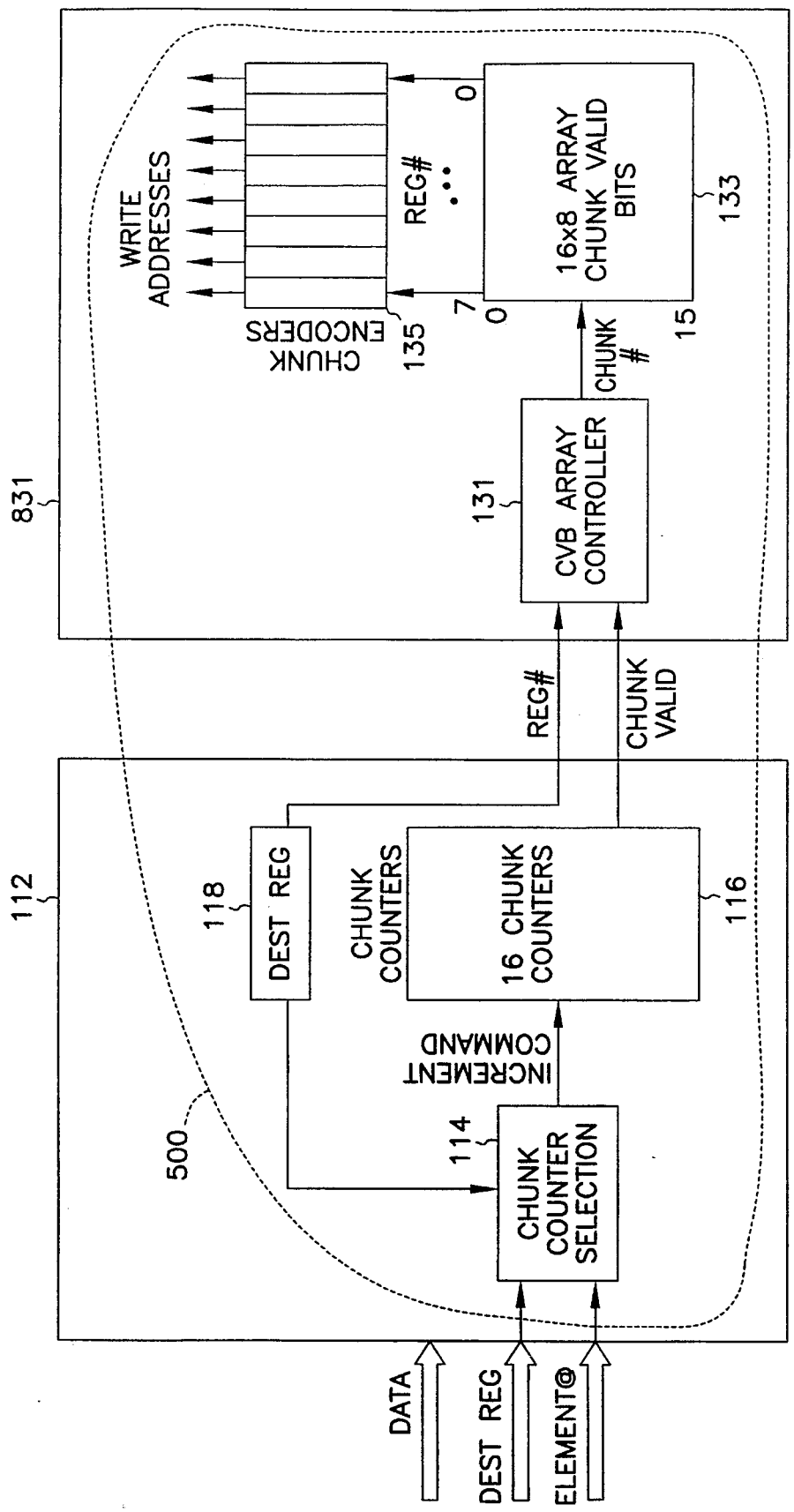
FIG. 8 is a schematic diagram illustrating details of an exemplary embodiment of a chunk-chaining controller.

FIG. 7 shows an alternative embodiment to that shown in FIG. 6 for a vector register 160 controller and element array. In the embodiment shown in FIG. 7, which is otherwise identical to that of FIG. 6, element addresses are fed through go-write pipeline 856 as part of the go-write signal. In this way, result elements emerging from processor pipeline 850 are accompanied by the element address to which they correspond emerging from go-write pipeline 856. Write-address register 822 and write-address incrementer 886 are replaced by maximum-valid-address register 825, which is used in conjunction with comparator 832 to provide an indication of whether elements are available as operands. The embodiment shown in FIG. 7 handles elements and corresponding element addresses coming from processor pipelines 850 and 856, respectively, similarly to elements and element addresses coming from memory pipelines 827 and 826, respectively.

Figure 10:
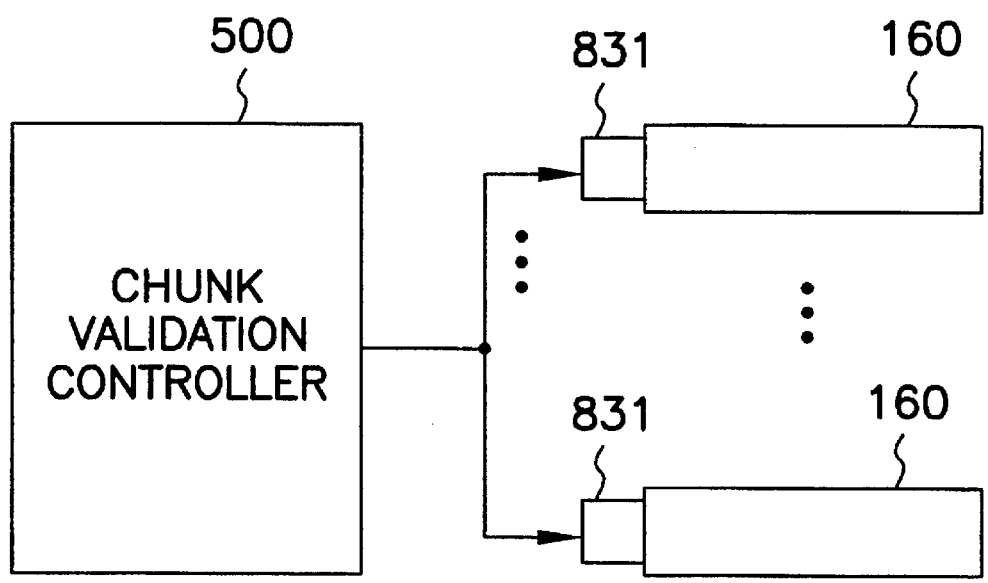
FIG. 10 is a schematic diagram illustrating a single chunk validation controller 500 shared by a plurality of vector registers 160.
Figure 11:
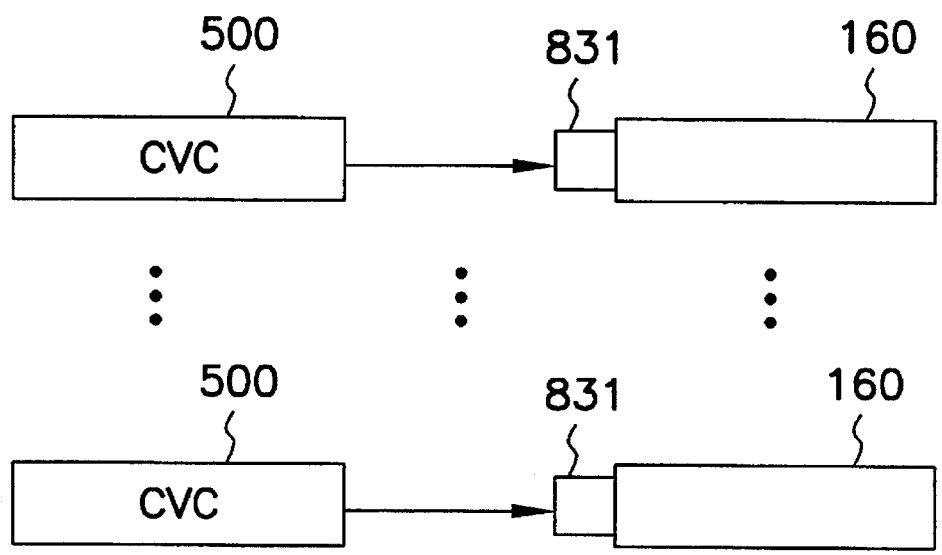
FIG. 11 is a schematic diagram illustrating a separate chunk validation controller 500 connected to each of a plurality of vector registers 160.

FIG. 10 illustrates one embodiment having a single chunk validation controller 500 shared by a plurality of vector registers 160. FIG. 11 illustrates an alternative embodiment having a separate chunk validation controller 500 connected to each of a plurality of vector registers 160. Other embodiments have various numbers of chunk validation controller 500 shared and connected to a plurality of vector registers 160.

Any pipelined computer must accommodate instructions which modify data which may be in its pipelines. Thus, any store operation must account for data which may be in a pipeline (e.g., data stored from the scalar registers must be reflected in the data which have been fetched and are in a pipeline for a subsequent operation by a vector register). In one embodiment, such pipeline maintenance is accomplished by techniques which alternatively give exclusive control of the memory interface to either the vector portions of the processor or to the scalar portions. In such an exemplary embodiment, the issue-control circuitry associated with instruction buffers 170 protects the programmer by preventing the issue of a vector operation until the completion of any scalar operations which may be in process, and similarly preventing the issue of any scalar operation until the completion of any in-process vector operations. Thus scalar operations are allowed to overlap other scalar operations, but not vector operations. Also, vector operations are allowed to overlap other vector operations, but not scalar operations. Common memory interface 112 prevents a vector write operation from overrunning any previous vector read operation, as long as both operations have the same "stride" (the address difference between addresses of successive elements in the vector is called the "stride"), that is, the write operation which issues later is not allowed to write to elements of the read operation which issued earlier until after the elements have been read. In this embodiment, the conflict between operations having different strides cannot be detected, and the programmer or compiler must use special instructions to hold the vector write operation until the vector read operation has completed. (E.g., if a read vector operation which reads elements from successive memory locations starting at 1000—i.e., 1000, 1001, 1002, 1003, 1004, 1005, 1006, 1007, etc.—is followed by a write operation which writes to every third memory location starting at 1001—i.e., 1001, 1004, 1007, etc.—the write operation might write locations 1004 or 1007 before the read operation could read the desired data. Thus the programmer or compiler would insert one of the special synchronization instructions after the vector read operation and before the vector write operation. This instruction would wait until the common memory request (from the read operation) cleared, in order to guarantee that the read operation completed before the possibly interfering write operation was allowed to start.)

In the embodiment shown in FIG. 1, vector registers 160 are comprised of eight vector registers, each containing up to 128 vector elements of 64 bits per element. Vector processors 165 process successive vector elements on successive clock cycles, but in a pipelined manner. For example, 128 elements of source vector register $V_j$ could be added to 128 respective elements of source vector register $V_k$ on 128 successive clocks, with the results of these 128 operations being loaded into the 128 elements of destination vector register $V_i$. The computer circuitry may take several cycles to initially load the pipeline, which then operates at one operation per clock.

In the embodiment shown in FIG. 1, S registers 120 are comprised of eight scalar registers, each containing 64 bits. Scalar processor 125 can process successive scalar registers on successive clock cycles, but in a less efficient pipelined manner than occurs with the method used by the vector processor described above.

In the embodiment shown in FIG. 1, T registers 140 are comprised of sixty-four scalar registers, each containing 64 bits. The contents of T registers 140 can be transferred to and from S registers 120, and to and from the set of common memories 602.

In the embodiment shown in FIG. 1, A registers 130 are comprised of eight address registers, each containing 64 bits. Address processor 135 can process successive address registers on successive clock cycles, but also in a less efficient pipelined manner than occurs with the method used by the vector processor described above.

In the embodiment shown in FIG. 1, B registers 150 are comprised of sixty-four scalar registers, each containing 64 bits. The contents of B registers 150 can be transferred to and from A registers 130, and to and from the set of common memories 602.

In the embodiment shown in FIG. 1, instruction I buffers 170 are comprised of eight groups of thirty-two instruction buffer registers per group, each instruction buffer register containing 64 bits. Instructions are fetched into groups in I buffers 170 for execution. Since data are only fetched into I buffers 170, and never stored, the scalar data cache 110 ignores data transfers to I buffers 170.

The term "translated" as used in this description shall apply to an address-mapping operation wherein an address which points to data in one set of memories is mapped into another address which points to a copy of said data which is located in another memory. For example, a logical address might be used to point to data in a "logical-address space" used by the compiler and the disk storage subsystem to track data and provide a flexible interface for programmers. When those data are loaded into common memories 602, physical addresses are used to locate the data.

In the embodiment shown in FIG. 1, the logical addresses are "translated" by digital logic hardware into physical addresses which are then used to access the data in the set of common memories 602. Such address translations provide a more flexible interface for programmers to use to access the data for instruction fetches, data fetches, or data stores.

Another significant performance limitation in a multiprocessor system is processor "lockout", or "blocking", which may occur when multiple processors are sharing common resources. In one embodiment, normal load, store, vector-load, and vector-store operations are not blocked or locked from one processor to another in a multi-processor system. Instead, conventional synchronization instructions such as atomic test-and-set instructions are used to signal between processors when certain shared resources are in-use or available. Programming convention or compiler restrictions are then used to hold-off execution of possibly conflicting code until the contention for the shared resource is resolved. Any suitable method may be used to determine whether there is such a processor-to-processor conflict, and to allow or block execution of subsequent non-conflicting instructions.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:

a memory; and vector processing apparatus comprising:

a plurality of vector registers coupled to said memory, wherein each vector register includes a plurality of chunks, and each chunk includes a plurality of elements;

a chunk-validation controller, wherein the chunk-validation controller marks each chunk valid after two or more elements in the chunk have been loaded from the memory;

a validity indicator corresponding to each of said vector registers, wherein each said validity indicator indicates a subset of elements in its corresponding vector register which are valid, and wherein each said validity indicator is connected to said chunk-validation controller;

an arithmetic logical functional unit (ALFU) coupled to said vector registers; and a vector register controller connected to control said vector registers and operating in response to program instructions in order to cause valid elements of a vector register, selected from said plurality of vector registers, to be successively transmitted to said ALFU.

2. A computer system according to claim 1 wherein said ALFU further comprises an address pipeline operable to hold element addresses corresponding to said operands of operations not yet completed while receiving element addresses corresponding to said operands of successive operations.

3. A computer system according to claim 2 further comprising:

an operand path selector coupled to an input of said address pipeline, responsive to program instructions, for selectively connecting individual vector registers and for transmitting element addresses as operands through said address pipeline of said ALFU means; and a result path selector coupled to an output of said address pipeline, responsive to program instructions, for receiving result addresses from said address pipeline of said ALFU means.

4. A vector processing apparatus for a computer having a main memory, comprising:

a plurality of vector registers coupled to said main memory, wherein each vector register includes a plurality of chunks, and each chunk includes a plurality of elements;

a chunk-validation controller, wherein the chunk-validation controller marks each chunk valid after two or more elements in the chunk have been loaded from the memory;

a validity indicator corresponding to each of said vector registers, wherein each said validity indicator indicates a subset of said elements in said corresponding vector register which are valid, and wherein each said validity indicator is connected to said chunk-validation controller;

an arithmetic logical functional unit (ALFU) coupled to said vector registers; and a vector register controller connected to control said vector registers in response to program instructions in order to cause valid elements of a vector register, selected from said plurality of vector registers, to be successively transmitted to said ALFU.

5. A vector processing apparatus according to claim 4 wherein said ALFU further comprises an address pipeline operable to hold element addresses corresponding to said operands of operations not yet completed while receiving element addresses corresponding to said operands of successive operations.

6. A vector processing apparatus according to claim 5 further comprising:

an operand path selector coupled to an input of said address pipeline, responsive to program instructions, for selectively connecting individual vector registers and for transmitting operand element addresses through said address pipeline of said ALFU means; and a result path selector coupled to an output of said address pipeline, responsive to program instructions, for receiving result element addresses from said address pipeline of said ALFU means.

7. A computer system comprising:

a memory; and vector processing apparatus comprising:

a plurality of vector register means coupled to said memory, each vector register means including a plurality of chunks, and each chunk including a plurality of elements;

for each of said vector register means, validity indicator means for indicating a subset of said elements which are valid;

chunk-validation controller means for adjusting a value of said validity indicator in response to an element in said vector register means becoming valid, wherein the chunk-validation controller means marks each chunk valid after two or more elements in the chunk have been loaded from the memory;

arithmetic logical functional unit (ALFU) means; and vector register controller means for controlling said vector register means in response to program instructions in order to cause valid elements of said vector register means to be successively transmitted to said ALFU means.

8. A computer system according to claim 7 wherein said ALFU means further comprises address pipeline means for holding element addresses corresponding to said operands for operations not yet completed while receiving element addresses corresponding to said operands for successive operations.

9. A computer system according to claim 8 further comprising:

operand path selector means coupled to an input of said address pipeline means, responsive to program instructions, for selectively connecting individual vector registers for transmitting element addresses as operands through said address pipeline of said ALFU means; and result path selector means coupled to an output of said address pipeline means, responsive to program instructions, for receiving result addresses from said address pipeline of said ALFU means.

10. A vector processing apparatus for a computer having a main memory, comprising:

a plurality of vector register means coupled to said main memory, each vector means including a plurality of chunks, and each chunk including a plurality of elements;

for each of said vector register means, a validity indicator means for indicating a subset of said elements which are valid;

chunk-validation controller means for adjusting a value of said validity indicator in response to an element in said vector register means becoming valid, wherein the chunk-validation controller means marks each chunk valid after two or more elements in the chunk have been loaded from the memory;

arithmetic logical functional unit (ALFU) means; and vector register controller means for controlling said vector register means in response to program instructions in order to cause valid elements of a selected vector register to be successively transmitted to said ALFU means.

11. A vector processing apparatus according to claim 10 wherein said ALFU means further comprises address pipeline means for holding element addresses corresponding to said operands for operations not yet completed while receiving element addresses corresponding to said operands for successive operations.

12. A vector processing apparatus according to claim 11 further comprising:

operand path selector means coupled to an input of said address pipeline means responsive to program instructions, for selectively connecting individual vector registers for transmitting element addresses as operands through said address pipeline of said ALFU means: and result path selector means coupled to an output of said address pipeline means, responsive to program instructions, for receiving result addresses from said address pipeline of said ALFU means.

13. A method for processing vectors in a computer having a main memory, comprising the steps of:

including a plurality of chunks for each of a plurality of vector registers, each chunk including a plurality of elements;

indicating a subset of said elements which are valid in a validity indicator;

adjusting a value of said validity indicator in response to a plurality of elements becoming valid, wherein each chunk is marked valid after two or more elements in the chunk have been loaded from the memory; and controlling one of said plurality of vector registers in response to program instructions in order to cause valid elements of a selected vector register to be successively transmitted to an arithmetic logical functional unit (ALFU), so that elements selected from said plurality of valid elements are streamed through said ALFU at a speed that is determined by the availability of valid elements from said one vector register.

14. A method for processing vectors according to claim 13 wherein said ALFU further comprises an address pipeline for holding element addresses corresponding to said operands for operations not yet completed while receiving element addresses corresponding to said operands for successive operations.

15. A method for processing vectors according to claim 14 further comprising the steps of:

selectively connecting individual vector registers to transmit operand element addresses through said address pipeline of said ALFU in response to program instructions; and receiving result element addresses from said address pipeline of said ALFU in response to program instructions.

16. A vector processing apparatus for a computer having a main memory, comprising:

a plurality of vector registers coupled to said main memory, each vector register means including a plurality of chunks, and each chunk including a plurality of elements of an ordered set of data;

for at least one of said vector registers, a validity pointer for indicating a range of consecutive elements in said vector register each of which is valid;

a chunk-validation controller coupled to said validity pointer for adjusting a value of said validity pointer in response to a plurality of consecutive elements becoming valid, wherein the chunk-validation controller marks each chunk valid after two or more elements in the chunk have been loaded from the memory;

an arithmetic logical functional unit (ALFU) coupled to said at least one of said vector registers; and a vector register controller connected to control said vector registers in response to program instructions for causing a selected operand vector register to successively transmit all elements of said range of valid elements to said ALFU, so that valid elements are streamed through said ALFU at a speed that is determined by the availability of valid elements from the vector registers.

17. Vector processing apparatus for a computer having a main memory, comprising:

a plurality of vector registers coupled to said main memory, each for holding a plurality of elements of an ordered set of data, each of said vector registers comprising a plurality of chunks, each said chunk comprising at least one element;

availability indication means coupled to said vector registers for indicating, for each said chunk, that said chunk is available only if all elements of said chunk are available/valid;

an arithmetic logical functional unit (ALFU), said ALFU including a pipeline for holding elements for operations not yet completed while receiving operands for successive operations;

path-select means responsive to program instructions for:
(a) selectively connecting individual vector registers for transmitting elements as operands to said ALFU, and
(b) receiving results from said ALFU; and control means connected to control said vector registers in response to program instructions for causing a selected operand vector register to successively transmit all elements of a chunk to a connected ALFU, provided that one or more chunks are available in said selected vector register, so that chunks of elements are streamed through said ALFUs at a speed that is determined by the availability of chunks of elements from the vector registers.

18. Vector processing apparatus for a computer having a main memory, comprising:

a plurality of vector registers coupled to said main memory, each for holding a plurality of elements of an ordered set of data, each of said vector registers comprising a plurality of chunks, each said chunk comprising at least one element;

means coupled to said vector registers for indicating, for each said chunk, that said chunk is available only if all elements of said chunk are available/valid;

at least one arithmetic logical functional unit (ALFU), each said ALFU including a pipeline for holding data for operations not yet completed while receiving operands for successive operations;

path-select means responsive to program instructions for:
(a) selectively connecting individual vector registers for transmitting data as operands to said ALFUs, and
(b) receiving results from said ALFUs; and control means connected to control said vector registers in response to program instructions for causing a selected operand vector register to successively transmit all elements of a chunk to a connected ALFU, provided that one or more chunks are available in said selected vector register, and for sending a go-write signal to said connected ALFU each time an element is transmitted thereto;

each of said ALFUs further including means for receiving and delaying said go-write signal a number of clock periods corresponding to the number of clock periods used by said ALFU to perform an operation, and for subsequently sending said delayed go-write signal back to said control means so that each result produced by said ALFU is signaled by the sending of the go-write signal back to said control means;

said control means further operative, in response to said delayed go-write signal, to cause a vector register selected as a result register to receive and store a result produced by a connected ALFU as an element of an ordered set of data representing a result vector, so that chunks of elements are streamed through said ALFUs at a speed that is determined by the availability of chunks of elements from the vector registers.

* * * * *

UNITED STATES PATENT AND TRADEMARK OFFICE
CERTIFICATE OF CORRECTION

PATENT NO. : 5,623,685

DATED : April 22, 1997

INVENTOR(S) : George W. Leedom et al.

It is certified that error appears in the above-identified patent and that said Letters Patent is hereby corrected as shown below:

At Column 17, line 67, please delete "each vector means" and insert --each vector register means--.

Signed and Sealed this

Thirtieth Day of September, 1997

Attest:

BRUCE LEHMAN

Attesting Officer

Commissioner of Patents and Trademarks